United States Patent
Fabian

[11] Patent Number: 5,837,024
[45] Date of Patent: Nov. 17, 1998

[54] PROCESS FOR THE PRODUCTION OF QUARTZ GLASS BODIES

[75] Inventor: Heinz Fabian, Freigericht, Germany

[73] Assignee: Heraeus Quarzglas GmbH, Hanau, Germany

[21] Appl. No.: 980,072

[22] Filed: Nov. 26, 1997

[30] Foreign Application Priority Data

Dec. 2, 1996 [DE] Germany ............ 196 49 935.6

[51] Int. Cl.⁶ .............. C03B 19/06; C03B 37/018; C03B 37/10
[52] U.S. Cl. .............. 65/17.4; 65/144; 65/414; 65/416; 65/427; 65/500
[58] Field of Search ............ 65/17.4, 32.5, 65/144, 157, 414, 416, 419, 426, 427, 428, 900

[56] References Cited

U.S. PATENT DOCUMENTS

| | | | |
|---|---|---|---|
| 3,227,032 | 1/1966 | Upton | 350/96.3 |
| 3,737,292 | 6/1973 | Keck et al. | 350/96.3 |
| 3,775,075 | 11/1973 | Keck et al. | 65/3 |
| 3,806,570 | 4/1974 | Flamenbaum et al. | 264/66 |
| 4,126,436 | 11/1978 | Bailey | 65/13 |
| 4,154,592 | 5/1979 | Bailey | 65/2 |
| 4,157,906 | 6/1979 | Bailey | 65/426 |
| 4,251,251 | 2/1981 | Blankenship | 65/426 |
| 4,362,545 | 12/1982 | Bailey et al. | 85/169 |
| 4,388,094 | 6/1983 | Carpenter et al. | 65/144 |
| 4,772,302 | 9/1988 | Abe | 65/426 |
| 4,810,276 | 3/1989 | Gilliland | |
| 5,000,773 | 3/1991 | La Noane et al. | 65/419 |
| 5,236,481 | 8/1993 | Berkey | 65/416 |

FOREIGN PATENT DOCUMENTS

| | | | |
|---|---|---|---|
| 0469190 | 12/1990 | European Pat. Off. | C03B 37/014 |
| 585761A | 4/1993 | Japan | C03B 20/00 |

*Primary Examiner*—Peter Chin
*Assistant Examiner*—Jacqueline A. Ruller
*Attorney, Agent, or Firm*—Kenneth E. Macklin; Milde, Hoffberg & Macklin, LLP

[57] ABSTRACT

An essentially cylindrical porous blank is formed by the deposition of $SiO_2$ particles onto the lateral cylindrical surface of a cylindrical mandrel, rotating around its longitudinal axis; this blank is provided with a holding element of quartz glass in the form of a hollow body, which surrounds a section of the mandrel and which is at least partially embedded in the area of one of the ends of the blank. The blank is then sintered. In order to securely support even heavy blanks without complicated holding devices, the holding element is fused into the area of at least one of the ends of the blank during the deposition process by the maintenance of a high temperature.

4 Claims, 1 Drawing Sheet

PROCESS FOR THE PRODUCTION OF QUARTZ GLASS BODIES

BACKGROUND OF THE INVENTION

The invention pertains to a process for the production of quartz glass bodies by depositing $SiO_2$ particles onto the lateral, cylindrical surface of a cylindrical mandrel rotating around its longitudinal axis to form an essentially cylindrical porous blank, and by sintering the blank thus produced. The blank is provided with a support element of quartz glass in the form of a hollow body, which surrounds a section of the mandrel and which is at least partially embedded in the area of one of the ends of the blank.

A process of this type is known from U.S. Pat. No. 4,362,545. According to the generally known method, $SiO_2$ particles are deposited in layers by means of a flame hydrolysis burner onto the lateral surface of a slightly conical mandrel, which is clamped at both ends in a lathe and rotated around its longitudinal axis, to produce a preform for optical fibers. By moving the burner back and forth along the longitudinal axis of the mandrel, a long, porous preform of $SiO_2$ particles is produced.

The mandrel extends through a sleeve-like holder with a conically tapering end, which faces the growing preform and has a circumferential bead. The mandrel is fixed in place geometrically with respect to the holder by means of space holders, which are clamped in the gap between the holder and the mandrel. The holder and the mandrel consist of, for example, aluminum oxide, graphite, or quartz glass. It is a relatively complicated process to produce the known holder.

During the deposition process, both the mandrel and the part of the holder provided with the bead are embedded in the growing preform. Once the deposition process is completed, the mandrel is removed. The finished preform can then be held suspended from the embedded holder in a vertical position for further processing; the bead prevents the preform from slipping off. Then the preform is sintered and collapsed.

The known process is suitable for the production of light preforms with relatively small outside diameters. In the case of heavy preforms, there is the danger that the holder can break out of the porous preform material. When it is desired to produce a heavy preform, furthermore, the $SiO_2$ must be deposited on a thicker mandrel of suitable strength. This is necessary especially in the case of long preforms to prevent the mandrel from sagging in the middle. A thicker mandrel, however, results in a larger bore in the preform, and this leads to problems with the collapsing of the bore.

Hollow cylinders of quartz glass are used as intermediate products for a wide variety of structural components for the optical and chemical industries. They are produced in a manner similar to the process described above by deposition of $SiO_2$ particles onto an elongated support rod to form a porous, hollow cylinder, which is then subjected to further treatment and sintered. The support rod is removed from the bore of the hollow cylinder before or after sintering. For many applications, it is desirable to have the largest possible ratio between the thickness of the wall and the outside diameter or between the outside diameter and the inside diameter. This ratio can be increased by providing the hollow cylinder with the smallest possible internal bore or by providing the hollow cylinder with the largest possible outside diameter. In both variants, the mechanical load-bearing capacity and thermal strength of the support rod represent limiting criteria. That is, first, the support rod must have the smallest possible outside diameter so that it will leave behind the smallest possible internal bore; and, second, the rod must support the weight of the hollow cylinder, which can easily exceed a hundred kilograms, and it must also withstand the thermal stress of the deposition process for several hours.

SUMMARY OF THE INVENTION

According to the invention, even heavy blanks can be held securely without the need for complicated holding devices.

This is accomplished by fusing the holding element into the area of at least one of the end surfaces of the blank during the deposition process by the application of a high temperature.

In the process according to the invention, the blank is therefore fused together with the holding element. The area where the holding element is fused into the blank is referred to below as the "vitrified area". In the vitrified area, the blank has a comparatively high density and, in association with this, a relatively high level of mechanical strength. Thus, heavy blanks can be supported without the danger that the retaining element will break out of the porous blank material. The blank and the holding element form an integral unit.

When $SiO_2$ particles are deposited to produce "soot bodies", a blank with an average relative density in the range of 10–35% is usually obtained (relative to the density of quartz glass of 2.2 g/cm$^3$). The density of the blank depends primarily on the surface temperature at the contact point of the flame of the deposition burner or other burner. The surface temperature can be adjusted and controlled by the temperature of the flame, by the distance between the surface of the blank and the burner, or by the relative velocity between the flame and surface of the blank resulting from the rotation of the blank and the translational movement of the burner along the surface of the blank. The higher the surface temperature, the greater the density of the blank. Adjusting the parameters to arrive at an average relative density of more than, for example, 70% presents the expert with no particular problem. This relatively high density, however, is arrived at only in the vitrified area, to which the holding element is connected. The relative density in the middle area of the blank is usually only 10–35%.

A density gradient is thus created between the vitrified area of high relative density and the middle area of the blank. A density gradient of this type is ideal with respect to the strength of the mechanical connection of the holding elements and especially with respect to the distribution of forces involved in supporting the blank. This is because the transition region, in which the density changes, provides a gradual transition between the area of the actual porous blank itself and the area where it is supported. Because both the vitrified area and also the transition area help support the weight of the blank, the forces in play here are distributed over a larger area; some of the load is taken away from the porous area of the blank.

The holding element is embedded in the vitrified area during the deposition process. After deposition, it can project to some extent out of the vitrified area, or it can be fused completely inside the vitrified area. In either case, the vitrified area ensures a solid mechanical connection between the blank and the holding element and thus prevents slippage and breakout. The holding element can therefore be designed in a very simple manner. The beads and conical areas provided in the known retaining elements are not required.

It has proved to be especially advantageous for the average relative density in the area where the holding element is fused into the porous blank to be at least 80% of the theoretical (maximum) density of quartz glass. As a result of the high average relative density in the vitrified area, an especially strong connection is achieved between the holding element and the blank.

A process in which a component in the form of a hollow body which surrounds a section of the mandrel and which during deposition is fused at least partially into the area of at least one of the ends of the blank is used as the holding element has proved to be especially effective. A holding element of this type can be of very simple design; for example, it can be designed as a sleeve, as a ring, or as a half-shell. To hold the blank, the ring or the sleeve can be connected to a suitable opposing piece; to facilitate this, the ring or sleeve can be designed, for example, as a threaded nut or bayonet nut, or they can be provided with an internal groove. Looking in the direction of the longitudinal axis of the mandrel, the hollow body surrounds only a section of the mandrel; and, looking in the circumferential direction of the mandrel, it can surround the mandrel either entirely or only partly. It is not necessary for the hollow body to project partly out of the blank which is forming, because gripping devices will also be able to grip the inside surface of the hollow body.

A procedure in which holding elements are fused into both ends of the blank has been found to be especially advantageous. The description given above applies in a corresponding manner to this procedure as well. Thus the blank is connected not only at one end but at both ends to holding elements. When the blank is supported horizontally, its weight is distributed uniformly between the holding elements. Heavier blanks can therefore be supported, and the danger that the holding elements might break out of the porous blank mate rial is less than it is when the blank is supported at only one end.

DETAILED DESCRIPTION OF THE PREFERRED EMBODIMENT

Figure 1:
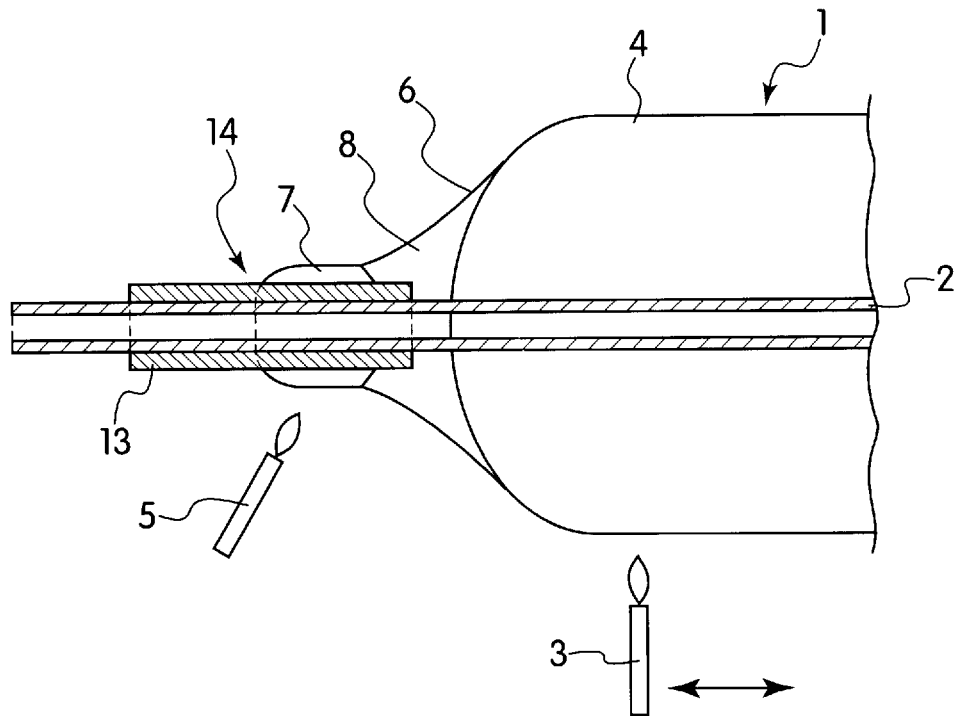
FIG. 1 is a schematic axial section showing a first variant of the process according to the invention, in which a quartz glass tube is embedded in each end of a cylinder (only one end shown)
Figure 2:
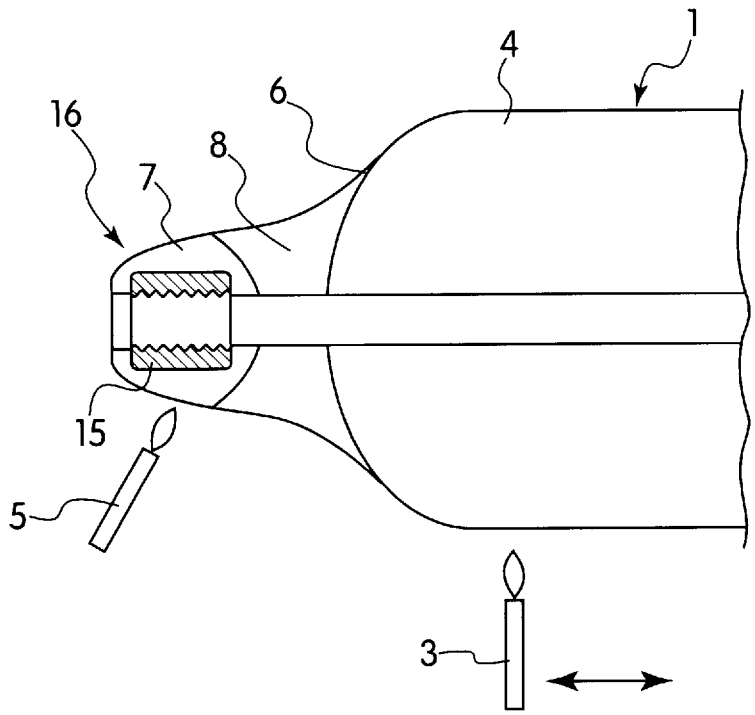
FIG. 2 shows an alternative method, in which a threaded ring is embedded in each end of a cylinder.

FIGS. 1 and 2 show how a section of a porous cylinder 1 is supported by means of measures implemented at one end. The measures taken to support the end of cylinder 1 shown are also implemented at the other end, which is not shown. In this state, cylinders 1 have an outside diameter of approximately 30 cm and an inside diameter of 3 cm.

Cylinders 1 are produced by the known flame hydrolysis method, according to which layers of $SiO_2$ particles are deposited onto a mandrel 2, rotating around its longitudinal axis, by one or more deposition burners 3, which move back and forth along the surface of cylinders 1. In the middle section 4, cylinders 1 have an average relative density of approximately 30% (relative to the density of quartz glass). In the area of the ends, the average density is higher. This is achieved by the use of stationary supplemental burners 5, which maintain a much higher surface temperature, averaged over time, at the ends than deposition burner or burners 3 do in middle section 4 of the cylinder. As a result, a higher relative density is produced in end area 6 of cylinder 1, where the cylinder tapers down conically, reaching more than 80% of the density of quartz glass in the area where the flame of supplemental burner 5 contacts the cylinder. In FIGS. 1 and 2, the area of maximum density is characterized by the darkest gray shading 7. Next to the area of maximum density (referred to in the following as vitrified area 7) is a transition area 8, in which a gradient exists between the high density of vitrified area 7 and the low average density of middle section 4. Transition area 8 or transition areas 8 can be recognized by their somewhat lighter gray shading. Middle area 4 with the lowest density is showed by the lightest gray shading. The boundaries between the various areas 4, 7, 8 are, of course, continuous and cannot be defined with precision. Boundary lines are shown in the figures only to help explain the process more clearly.

Supplemental burner 5, which is stationary, and deposition burners 3, which move back and forth, have approximately the same flame temperature. At the point where the flame of deposition burner 3 contacts cylinder 1, the surface of the cylinder reaches a temperature of approximately 1,300° C. As a result of the translational movement of deposition burner 3, however, the surface of the cylinder can cool to some extent again during the course of each cycle of movement. In contrast, the surface rotating under supplemental burner 5 cannot cool off to the same extent, with the result that a higher temperature and thus a higher density are produced there.

In the exemplary embodiments, the density of vitrified area 7 is approximately 90–100%. Its minimum diameter is about 10 cm, and it is about 15 cm long. At both ends, transition areas 8 of lower density are formed adjacent to completely vitrified areas 7. In transition areas 8 facing cylinder 1, a density gradient between the density of vitrified area 7 and the density of middle part 4 of cylinder 1 extends over a length of approximately 20 cm.

In the following, the process according to the invention is explained in greater detail on the basis of the exemplary embodiments illustrated in FIGS. 1 and 2.

In the case of the process shown in FIG. 1, a quartz glass tube 13 is firmly embedded in the end of each vitrified area 7 during the deposition process. Quartz glass tube 13 has an inside diameter of 3.05 cm, an outside diameter of 10 cm, and a length of 30 cm. It is fused over approximately half of its length into cylinder 1. Quartz glass tube 13 is firmly embedded by the use of supplemental burner 5 (as explained above) to produce an average relative density of 95% in vitrified area 7. The surface temperature under burner 5 is about 1400° C. As a result, quartz glass tube 13 is fused with vitrified area 7, so that, in the course of the deposition process, a strong bond is produced. There is no need for quartz glass tube 13 to have a complicated design, including a circumferential bead, for example.

The forces involved in supporting cylinder 1 are distributed over a large volume; vitrified area 7 and transition area 8 are to be considered here as part of a tubular support 14 for the cylinder. Although a defined boundary between cylinder 1 and its support 14 does not exist, the forces supporting cylinder 1 are absorbed in principle primarily by the volume areas which, as a result of their higher density, also have greater mechanical strength.

Cylinder 1 produced in this way can weigh more than 100 kg. After mandrel 2 has been removed, the cylinder can be handled for further processing by manipulation of the part of embedded quartz glass tube 13 which projects out of cylinder 1. The cylinder can thus be mounted for processing either by suspending it vertically or by supporting it horizontally.

FIG. 2 shows a process in which a holder 16 in the form of a threaded ring 15 embedded in vitrified area 7 is formed during the deposition process. Threaded ring 15 consists of quartz glass; it has an inside thread with a diameter which is somewhat smaller than the outside diameter of the mandrel (not shown in FIG. 2). The outside diameter and the height of threaded ring 15 are both about 5 cm. Before the deposition process begins, two of these rings are attached to the mandrel at the points where the ends of cylinder 1 will be, and during the deposition process they are coated with $SiO_2$ particles and thus gradually embedded in growing cylinder 1. Simultaneously, a higher temperature is maintained in the area of threaded rings 17 by supplemental burner 5 (as described above), and thus an average relative density of approximately 90% is produced in vitrified area 7. The surface temperature under burner 5 is about 1350° C.

In the exemplary embodiment, threaded ring 15 is completely embedded in vitrified area 7 and forms together with it a holder 16 for cylinder 1. To facilitate the further handling of the cylinder, such as for sintering, the firmly embedded threaded ring 15 can be screwed to a suitable opposing piece.

I claim:

1. Process for the production of a quartz glass body, said process comprising providing a cylindrical mandrel having a longitudinal axis and a cylindrical surface, providing a holding element comprising a hollow quartz glass body which is fitted concentrically about a section of said mandrel, depositing $SiO_2$ particles onto said cylindrical surface of said mandrel while rotating said mandrel about said longitudinal axis, thereby forming an essentially cylindrical porous blank of quartz glass, said blank having an end formed on said holding element, and fusing said holding element into said end of said blank by maintaining a sufficiently high surface temperature of said end during deposition so that said end acquires an average relative density of at least 80% of theoretical density of quartz glass.

2. Process as in claim 1 wherein a pair of holding elements are fitted concentrically about sections of said mandrel, said blank having opposed ends formed on respective holding elements.

3. Process as in claim 1 further comprising sintering said cylindrical porous blank following deposition to produce a quartz glass body.

4. Process as in claim 3 wherein said mandrel is removed and said blank is handled using said holding element during sintering.

* * * * *